United States Patent
Tran et al.

(10) Patent No.: US 7,887,630 B2
(45) Date of Patent: Feb. 15, 2011

(54) GLYCERIN BY-PRODUCTS AND METHODS OF USING SAME

(75) Inventors: Bo Tran, Chicago, IL (US); Sankar Bhattacharja, Niles, IL (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 12/757,667

(22) Filed: Apr. 9, 2010

(65) Prior Publication Data

US 2010/0210182 A1 Aug. 19, 2010

Related U.S. Application Data

(62) Division of application No. 11/385,082, filed on Mar. 21, 2006.

(51) Int. Cl.
*C04B 40/00* (2006.01)
*B02C 23/06* (2006.01)
*B02C 19/00* (2006.01)
*B04B 15/04* (2006.01)
*B02B 5/02* (2006.01)

(52) U.S. Cl. ............................ 106/823; 241/16; 241/22

(58) Field of Classification Search ................. 106/823; 51/293, 307; 241/16, 22; 44/605
See application file for complete search history.

(56) References Cited

U.S. PATENT DOCUMENTS 3,615,785 A * 10/1971 Moorer et al. ............... 106/724
4,204,877 A * 5/1980 Moorer et al. ............... 106/724
6,890,451 B2 * 5/2005 Sapienza et al. .............. 252/70

* cited by examiner

*Primary Examiner*—Jerry Lorengo
*Assistant Examiner*—Shuangyi Abu Ali
(74) *Attorney, Agent, or Firm*—Benjamin E. Carlsen; Michael B. Martin

(57) ABSTRACT

Methods and compositions for grinding materials are provided. In an embodiment, the present invention provides a method of grinding solid materials. For example, the method can comprise mixing the solid material with the grinding aid, and using a grinding media such as steel balls to grind the solids. The grinding aid composition can comprise one or more glycerin by-products derived from a biodiesel manufacturing process. The grinding aid composition can also comprise one or more glycerin by-products of transesterification reactions involving triglycerides. The grinding aid can be added to the grinding process as a solution.

12 Claims, No Drawings

GLYCERIN BY-PRODUCTS AND METHODS OF USING SAME

CROSS-REFERENCE TO RELATED APPLICATIONS

This application is a Divisional Application claiming priority from U.S. patent application Ser. No. 11/385,082 filed on Mar. 21, 2006.

STATEMENT REGARDING FEDERALLY SPONSORED RESEARCH OR DEVELOPMENT

Not Applicable.

BACKGROUND OF THE INVENTION

The present invention relates generally to grinding aid technologies. More specifically, the present invention relates to grinding aid compositions and methods of using the same.

The grinding operation consumes substantial quantities of energy. As the particles get finer, grinding progressively becomes more energy intensive. It is, therefore, a common practice to employ grinding aids which increase the efficiency of the grinding operation and thereby the throughput of the grinding mill.

Grinding aids are materials that facilitate grinding in ball, rod, or roller mills by compensating the charges on freshly broken surfaces. Through adsorption of the molecules of grinding aids to the surfaces of ground particles, the surface energy requirements are satisfied. This minimizes particle agglomeration and prevents caking of the mill interior wall and coating of the grinding media. Mill efficiency and throughput are increased as a result.

Many grinding aid formulations are based on glycols. It is desirable to provide and utilize cost-effective grinding aids that are environmentally friendly and preferably derived from renewable sources.

The art described in this section is not intended to constitute an admission that any patent, publication or other information referred to herein is "prior art" with respect to this invention, unless specifically designated as such. In addition, this section should not be construed to mean that a search has been made or that no other pertinent information as defined in 37 C.F.R. §1.56(a) exists.

BRIEF SUMMARY OF THE INVENTION

The present invention relates generally to grinding aid technologies. More specifically, the present invention relates to grinding aid compositions and methods of using the same.

In an embodiment, the present invention provides a method of efficiently grinding solid materials. For example, the method can comprise mixing the solid material with the grinding aid, and using a grinding media such as steel balls to grind the solids. Grinding aid can also be introduced during the grinding operation. The grinding aid composition can comprise one or more glycerin by-products derived from a biodiesel manufacturing process. The grinding aid composition can also comprise one or more glycerin by-products of transesterification reactions involving triglycerides. The grinding aid can be added to the grinding process as a solution.

In an embodiment, the glycerin by-product can be generated during the manufacture of biodiesel. Biodiesel can be manufactured through a transesterification process in which vegetable oils and/or animal fats are converted to fatty acid alkyl esters and by-products containing glycerin.

In an embodiment, the glycerin by-product comprises about 50 to about 95 weight percent of glycerin.

In an embodiment, the glycerin by-product further comprises one or more components selected from the group consisting of methyl esters, non-glycerol organic material, collectively called "MONG", salts, methanol, water and combinations thereof.

In an embodiment, the glycerin by-product further comprises one or more inorganic salts.

In another embodiment, the present invention provides a method of efficiently grinding solid material. For example, the method can comprise adding a grinding aid composition to the solid material to reduce the energy requirement to grind the solid material. The grinding aid composition can comprise one or more glycerin by-products derived from a biodiesel manufacturing process. Grinding aid facilitates grinding in ball, rod, or roller mills, by eliminating ball coating and caking by dispersing the ground solid material. The grinding aid can be added in solution to the mill feed or directly into the mill itself. The grinding aid prevents ball coating and consequently mill efficiency is increased. Power cost is thus reduced.

In another embodiment, the present invention provides a grinding aid composition comprising glycerin by-products of transesterification reactions involving triglycerides.

An advantage of the present invention is to provide cost-effective method of grinding solid materials. The present invention offers further advantages in that it is environmentally friendly and derived from renewable sources.

Additional features and advantages are described herein, and will be apparent from, the following Detailed Description.

DETAILED DESCRIPTION OF THE INVENTION

The present invention relates generally to grinding aid technologies. More specifically, the present invention relates to grinding aid compositions comprising glycerin containing by-products of biodiesel manufacturing processes, and/or transesterification reactions involving triglycerides and methods of using same.

In the present specification, the term "grinding aid" should be understood to mean compositions that facilitate grinding. Suitable processes for accomplishing this include, but are not limited to, grinding portland cement clinker, calcined and non-calcined limestone, and similar technologies.

In the present specification, the term "by-products" should be understood to mean by-products derived from biodiesel manufacturing processes, and/or transesterification reactions involving triglycerides. Environmentally friendly means non-hazardous, non-toxic, biodegradable, and derived from renewable sources.

In an embodiment, the present invention provides grinding aid compositions comprising glycerin-containing by-products of transesterification reactions involving triglycerides.

In an embodiment, the present invention provides grinding aid compositions comprising glycerin-containing by-products of biodiesel manufacturing processes.

The glycerin by-products of biodiesel manufacturing of the present invention can be economic and effective grinding aids, for example, to grind portland cement clinker. In addition, the glycerin by-products are environmentally friendly and derived from renewable sources. The glycerin by-products are also non-flammable and can provide benefits in applications where there is a "high or no" flash point requirement.

For example, portland cement clinker is often ground when it is hotter than 50.degree. C. The glycerin by-products can be used to supplement or replace conventional hazardous grinding aids such as glycol mixtures that include ethylene glycol, a toxic material. The present invention offers an added benefit of not posing any environmental and/or human health hazard if accidentally released into the environment and/or if contacted by humans and/or animals.

Biodiesel is a cleaner-burning diesel replacement fuel made from natural, renewable sources. For example, biodiesel can include fatty acid alkyl esters used as a cleaner-burning diesel replacement fuel made from sources such as new and used vegetable oils and animal fats.

According to the American Fuel Data Center of the U.S. Department of Energy, approximately 55% of the biodiesel is currently produced from recycled fat or oil feedstock, including recycled cooking grease. The other half of the industry is limited to vegetable oils, the least expensive of which is soy oil. The soy industry has been the driving force behind biodiesel commercialization because of excess production capacity, product surpluses, and declining prices. Similar issues apply to the recycled grease and animal fats industry, even though these feedstocks are less expensive than soy oils. Based on the combined resources of both industries, there is enough of the feedstock to supply 1.9 billion gallons of biodiesel.

Biodiesel can be made through a chemical process called transesterification in which vegetable oil or animal fats are converted to fatty acid alkyl esters and glycerin by-products. Such oils and fats include, for example, tallow, crude tall oil, coconut oil, rapeseed oil, canola oil, palm kernel oil and soybean oil. Triglycerides, the principal components of animal fats and of vegetable oils, are esters of glycerol, a trihydric alcohol, with fatty acids of varying molecular weight. Three synthetic pathways can be used to produce fatty acid alkyl esters from oils and fats: [0024] base-catalyzed transesterification of the oil; [0025] direct acid-catalyzed esterification of the oil; and conversion of the oil to fatty acids and subsequent esterification to biodiesel.

The majority of fatty acid alkyl esters are produced by the base-catalyzed method. In general, the catalyst used for transesterification of the oil to produce biodiesel commercially can be typically any base, most preferably sodium hydroxide or potassium hydroxide.

In the biodiesel manufacturing process, the oils and fats can be filtered and preprocessed to remove water and contaminants. If free fatty acids are present, they can be removed or transformed into biodiesel using special pretreatment technologies, such as acid catalyzed esterification. The pretreated oils and fats can then be mixed with an alcohol and a catalyst (e.g. base). The base used for the reaction is typically sodium hydroxide or potassium hydroxide, being dissolved in the alcohol used (typically ethanol or methanol) to form the corresponding alkoxide, with standard agitation or mixing. It should be appreciated that any suitable base can be used. The alkoxide may then be charged into a closed reaction vessel, and the oils and fats are added. The system can then be closed, and held at about 71.degree. C. (160.degree. F) for a period of about 1 to 8 hours, although some systems recommend that the reactions take place at room temperature.

Once the reactions are complete the oil molecules (e.g. triglycerides) are broken apart and two major products are produced: 1) a crude fatty acid alkyl esters phase (i.e. biodiesel phase) and 2) a glycerin by-product phase. Typically, the crude fatty acid alkyl esters phase forms a layer on top of the denser glycerin by-product phase. Because the glycerin by-product phase is denser than the biodiesel phase, the two can be gravity separated. For example, the glycerin by-product phase can be simply drawn off the bottom of a settling vessel. In some cases, a centrifuge may be employed to speed the separation of the two phases.

The glycerin by-product phase typically consists of a mixture of glycerin, methyl esters, methanol, mong, inorganic salts and water. Mong is "material organic non glycerol". Mong normally consists of soaps, free fatty acids, and other impurities.

Typical inorganic salts include, for example, salts (e.g. chlorides and sulfates) of sodium, potassium and/or calcium. In an embodiment, the by-products can contain about 0.1 to about 7 weight percent of the inorganic salts. In an embodiment, the inorganic salts are selected from sodium and potassium chloride.

In an embodiment, the glycerin by-product phase comprises a mixture of about 50 to about 95 weight percent glycerin, about 0.01 to about 5 weight percent methyl esters and methanol, about 0.1 to about 3 weight percent mong, about 0.1 to about 7 weight percent inorganic salts and about 4 to about 49 weight percent water.

The glycerin by-products of biodiesel manufacturing are inexpensive and their use can be economical and effective for a variety of grinding aid technologies. For example, this invention offers an alternative to existing grinding aid formulations such as those disclosed in U.S. Pat. No. 4,204,877 which describes the use of di-, tri-, and tetraglycerol, and mixtures thereof. The present invention offers an alternative that is economical and derived from renewable sources.

In an embodiment, the present invention provides methods of grinding solid materials. For example, the grinding aid compositions comprising the glycerin by-products can be useful in grinding the following materials including, but not limited to, portland cement clinker, calcined and non-calcined limestone, mineral ores, oxide and non-oxide ceramics, or man-made matter. The grinding aid compositions can also be used in conjunction with other suitable grinding aid formulations and/or cement or concrete additives. These additives can be mixed with the byproduct glycerin grinding aid and used to control setting behavior of portland cement and prevent deleterious reactions in concrete that compromise durability.

In an embodiment, the solid is portland cement clinker.

In an embodiment, the portland cement clinker is formed by pyroprocessing an intimate mixture of finely ground limestone, clay, and suitable source of iron oxide. In the case of portland cement, the clinker is ground with the addition of about 3 to about 5 percent of gypsum to control the setting properties of the finished cement. Small amounts of other substances may be added during grinding to impart special properties to the product. Portland cement is commonly ground to 90% (by mass) finer than 44 micron (minus 325 mesh).

Grinding aids are materials that facilitate grinding by eliminating caking and ball coating by dispersing the material being ground. The grinding aids may be added in concentrated form or may be diluted with up to about 50 weight percent of water or other suitable diluents, or a mixture thereof. The grinding aids may be added to the mill feed or directly into the mill itself. Grinding aids used in grinding cement clinker are added from 0.006% to 0.08% of the clinker weight. The majority of grinding aids are substances work by adsorption to the ground particles, so that surface charge requirements are satisfied, which reduces the number of unsatisfied bonds to attract other particles and cause agglomeration. Grinding aids improves mill efficiency by increasing throughput, reducing power demand, and smoothing operations. Grinding aids also increase the efficiency of air separators by dispersing the solids so that the smaller solids are not carried by the larger ones. This improves the classification process and assist meeting the quality requirements. By elimination of the surface energy forces that normally cause inter-particle attraction, grinding aids improve flowability after grinding and prevents hang-ups in storage silos.

While the present invention is described above in connection with representative or illustrative embodiments, these embodiments are not intended to be exhaustive or limiting of the invention. Rather, the invention is intended to cover all alternatives, modifications and equivalents included within its spirit and scope, as defined by the appended claims.

While this invention may be embodied in many different forms, there are shown in and described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments described herein and incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A method of grinding solids comprising providing a grinding aid composition and grinding the solids in the presence of the grinding aid composition, wherein the grinding aid composition comprises least one of a biodiesel manufacturing process by-product consists of glycerin, mong, methanol, ethyl ester, inorganic salt and water or a transesterification reaction involving triglycerides by-product consists of glycerin, mong, methanol, ethyl ester inorganic salt and water or a mixture thereof.

2. The method of claim 1 wherein the by-product comprises about 50 to about 95 weight percent of glycerin.

3. The method of claim 2, wherein the by-product is derived from a biodiesel manufacturing process.

4. The method of claim 2 wherein the by-product is derived from transesterification reactions involving triglycerides.

5. The method of claim 1 wherein the by-product comprises about 0.01 to about 7 weight percent of one or more inorganic salts.

6. The method of claim 1 wherein the by-product is be diluted with up to about 50 weight percent of water.

7. The method of claim 1 wherein the grinding is performed in the presence of a grinding media.

8. The method of claim 1 wherein the grinding is performed in a ball, rod, or roller mill.

9. The method of claim 1 wherein the solid is portland cement clinker.

10. The method of claim 1 wherein the grinding aid composition reduces the power requirement needed for grinding solids.

11. The method of claim 1 wherein the solid is clinker cement and the grinding aid composition is added from about 0.006% to 0.08% of the clinker cement weight.

12. The method of claim 1 wherein the composition does not include diglycerol, triglycerol, or tetraglycerol.

* * * * *

UNITED STATES PATENT AND TRADEMARK OFFICE
CERTIFICATE OF CORRECTION

PATENT NO. : 7,887,630 B2
APPLICATION NO. : 12/757667
DATED : February 15, 2011
INVENTOR(S) : Bo Tran and Sankar Bhattacharja It is certified that error appears in the above-identified patent and that said Letters Patent is hereby corrected as shown below:

In column 6 line 10 the word "at" should be between the words "comprises" and "least".
In column 6 line 12 the word "ethyl" should instead be "methyl".
In column 6 line 14 the word "ethyl" should instead be "methyl".

Signed and Sealed this
Ninth Day of April, 2013

Teresa Stanek Rea
*Acting Director of the United States Patent and Trademark Office*